United States Patent
Imaizumi

(10) Patent No.: US 10,798,262 B2
(45) Date of Patent: Oct. 6, 2020

(54) IMAGE PROCESSING APPARATUS, IMAGE PROCESSING APPARATUS CONTROLLING METHOD, AND RECORDING MEDIUM

(71) Applicant: Yuki Imaizumi, Kanagawa (JP)

(72) Inventor: Yuki Imaizumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/656,697

(22) Filed: Oct. 18, 2019

(65) Prior Publication Data

US 2020/0137254 A1 Apr. 30, 2020

(30) Foreign Application Priority Data

Oct. 31, 2018 (JP) ................................ 2018-205984

(51) Int. Cl.
*H04N 1/00* (2006.01)
*H04N 1/21* (2006.01)

(52) U.S. Cl.
CPC ..... *H04N 1/00933* (2013.01); *H04N 1/00798* (2013.01); *H04N 1/00931* (2013.01); *H04N 1/2129* (2013.01); *H04N 2201/0094* (2013.01)

(58) Field of Classification Search
CPC ........... H04N 1/00933; H04N 1/00798; H04N 1/00931; H04N 1/2129; H04N 2201/0094
USPC ....................................................... 358/1.16
See application file for complete search history.

(56) References Cited

U.S. PATENT DOCUMENTS

| 4,665,556 A * | 5/1987 | Fukushima ............... G06T 1/20 382/304 |
| 8,520,250 B2 | 8/2013 | Imaizumi |
| 8,849,067 B2 | 9/2014 | Sasaki |
| 8,904,069 B2 | 12/2014 | Tanaka et al. |
| 9,513,694 B2 | 12/2016 | Imaizumi |
| 9,571,020 B2 | 2/2017 | Imaizumi |
| 10,298,808 B2 | 5/2019 | Akiyama et al. |
| 2009/0316169 A1* | 12/2009 | Katsunoi ............ H04N 1/32561 358/1.9 |
| 2013/0077868 A1* | 3/2013 | Ito ..................... H04N 1/32358 382/195 |

(Continued)

FOREIGN PATENT DOCUMENTS

JP 2012-098883 5/2012
JP 2013-192197 9/2013

*Primary Examiner* — Allen H Nguyen
(74) *Attorney, Agent, or Firm* — IPUSA, PLLC

(57) ABSTRACT

An image processing apparatus includes a memory holding image data generated by an image reader; a memory controller for accessing the memory; first and second image processors for executing image processing on the image data one line at a time, the second image processor being added when implementing functional expansion; a connector for connecting the first and second image processors by a transfer path of the image data when implementing the functional expansion; first and second generators for respectively generating first and second allowance signals for allowing reading of a next line of the image data from the memory, according to the image processing times taken by the first and second image processors; and an allower configured to output, to the memory controller, a third allowance signal for allowing reading of the next line of the image data from the memory, based on the first and second allowance signals.

10 Claims, 11 Drawing Sheets

(56) References Cited

U.S. PATENT DOCUMENTS

2013/0176590 A1* 7/2013 Shiraishi ................ H04N 1/415
                                                          358/1.15
2013/0182026 A1* 7/2013 Satake ................ B41J 2/04588
                                                          347/10

* cited by examiner

IMAGE PROCESSING APPARATUS, IMAGE PROCESSING APPARATUS CONTROLLING METHOD, AND RECORDING MEDIUM

CROSS-REFERENCE TO RELATED APPLICATION

The present application is based on and claims priority under 35 U.S.C. § 119 to Japanese Patent Application No. 2018-205984, filed on Oct. 31, 2018, the contents of which are incorporated herein by reference in their entirety.

BACKGROUND OF THE INVENTION

1. Field of the Invention

The present invention relates to an image processing apparatus, an image processing apparatus controlling method, and a recording medium.

2. Description of the Related Art

In the related art, an image processing apparatus such as a multifunction peripheral (MFP) having a function of simultaneously reading images on both sides of a sheet, has been developed. In an image processing apparatus of this type, image data on the front side and image data on the back side are read at the same time and are temporarily stored in a memory inside an engine that performs image processing. The image on the front side and the image on the back side stored in the memory are sequentially read line-by-line and are subjected to image processing. In this case, while executing image processing on one line, an allowance signal for reading the image data of the next line from the memory inside the engine is output, thereby shortening the cycle of image processing and improving the transfer efficiency of the image data (see, for example, Patent Document 1).

Patent Document 1: Japanese Unexamined Patent Application Publication No. 2013-192197

SUMMARY OF THE INVENTION

According to one aspect of the present invention, there is provided an image processing apparatus including a first memory configured to hold image data generated by an image reader; a memory controller configured to access the first memory; a first image processor configured to execute image processing on the image data one line at a time; a second image processor configured to execute image processing on the image data one line at a time, the second image processor being added when implementing functional expansion; a connector configured to connect the first image processor and the second image processor by a transfer path of the image data when implementing the functional expansion; a first generator configured to generate a first allowance signal for allowing reading of a next line of the image data from the first memory, according to an image processing time taken by the first image processor; a second generator configured to generate a second allowance signal for allowing reading of the next line of the image data from the first memory, according to an image processing time taken by the second image processor; and an allower configured tb output, to the memory controller, a third allowance signal for allowing reading of the next line of the image data from the first memory, based on the first allowance signal and the second allowance signal.

DETAILED DESCRIPTION OF THE PREFERRED EMBODIMENTS

For example, when a new image processing function is added to the existing image processing by implementing functional expansion, the latency of the image processing varies, and, therefore, the output timing of the above-mentioned allowance signal needs to be changed depending on whether functional expansion is implemented. However, no method has been proposed for changing the output timing of the allowance signal depending on whether functional expansion is implemented. If the output timing of the allowance signal is too early and the next image data is transferred while image processing is being performed, abnormal image data may be generated. Further, when functional expansion is implemented by connecting a new image processing module to the image processing apparatus, it is necessary to communicate image data between the main body unit of the image processing apparatus and the new image processing module. In this case, it is necessary to adjust the output timing of the allowance signal according to the variation in the communication rate depending on the communication state.

A problem to be addressed by an embodiment of the present invention is to prevent the transfer performance of image data from being degraded, without generating abnormal image data, even when the image processing time varies according to whether functional expansion is implemented.

Hereinafter, embodiments will be described with reference to the drawings. In the following, a code indicating a data line or a signal line is also used as the code indicating data or a signal.

Figure 1:
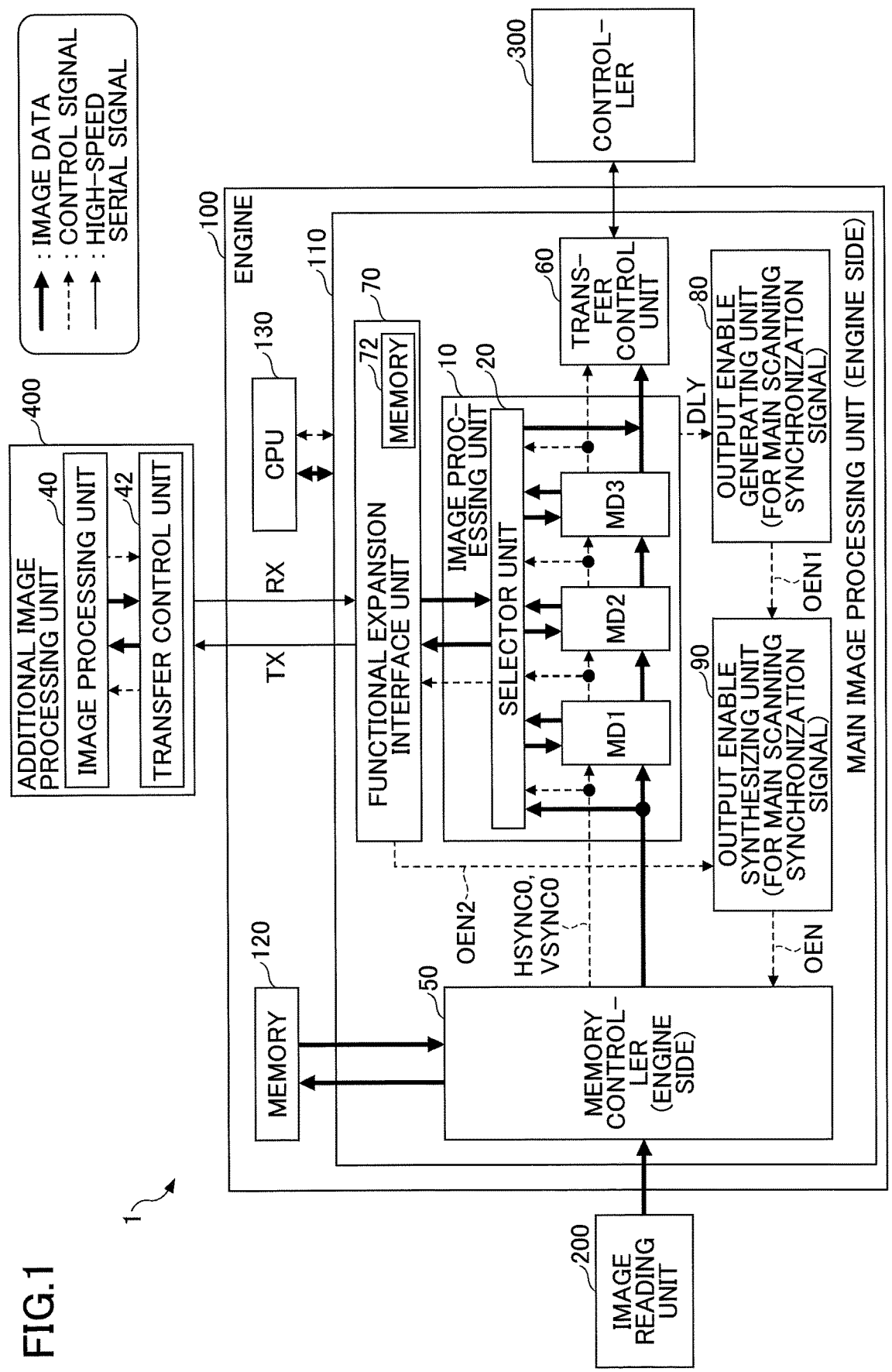
FIG. 1 is a block diagram illustrating an image processing apparatus according to an embodiment of the present invention.

FIG. 1 is a block diagram of an image processing apparatus according to an embodiment of the present invention. In the figure, thick solid line arrows indicate data such as image data, dashed line arrows indicate control signals, and thin solid line arrows indicate high speed serial signals, for example. For example, a signal line by which a high-speed serial signal is transmitted, may be a Peripheral Component Interconnect (PCI) bus or a Universal Serial Bus (USB) or the like. Note that a communication interface other than the high-speed serial bus interface may be used for the thin solid line arrow.

An image processing apparatus 1 illustrated in FIG. 1 is included in a digital multifunction peripheral having, for example, a copy function, a printer function, a scanner function, and a facsimile function, and has a function for performing image processing on image data generated by reading a document or the like. The image processing apparatus 1 may be a printer or a copier with a scanner function.

The image processing apparatus 1 includes an engine 100, an image reading unit 200, a controller 300, and an additional image processing unit 400. The image reading unit 200 includes, for example, a Charge Coupled Device (CCD) for reading the front side of a document and a Contact Image Sensor (CIS) for reading the back side of the document. The image reading unit 200 can simultaneously read the front side and the back side of a document to generate image data of the front side and image data of the back side. The image reading unit 200 may be configured to read only one side of a document. The engine 100 executes image processing on image data generated by the image reading unit 200.

The controller 300 controls the entire image processing apparatus 1 and has a processing function such as rotating image data (image), which has undergone image processing, output from the engine 100. The controller 300 may output image data, which has undergone image processing, to a printer unit (not illustrated) to be printed on a paper sheet.

The engine 100 includes a main image processing unit 110, a memory 120, and a central processing unit (CPU) 130 that is an example of a computer. The main image processing unit 110 includes an image processing unit 10, a memory controller 50, a transfer control unit 60, a functional expansion interface unit 70 including a memory 72, an output enable generating unit 80, and an output enable synthesizing unit 90.

The image processing unit 10 includes a plurality of image processing modules MD (MD1, MD2, and MD3) and a selector unit 20. The number of image processing modules MD is not limited to three. The image processing modules MD1 to MD3, which are examples of a first image processor and sub-image processors, have functions of executing different types of image processing from each other, such as color conversion processing, gradation processing, multiplication processing, and image characteristics correction processing. For example, the image processing modules MD1 to MD3 are connected in series, and pieces of image data generated by the image reading unit 200 are sequentially processed. The image processing module MD to be operated can be selected by control of the CPU 130 based on a specification by a user who uses the image processing apparatus 1. Hereinafter, an image processing module MD may be simply referred to as a module MD.

Figure 2:
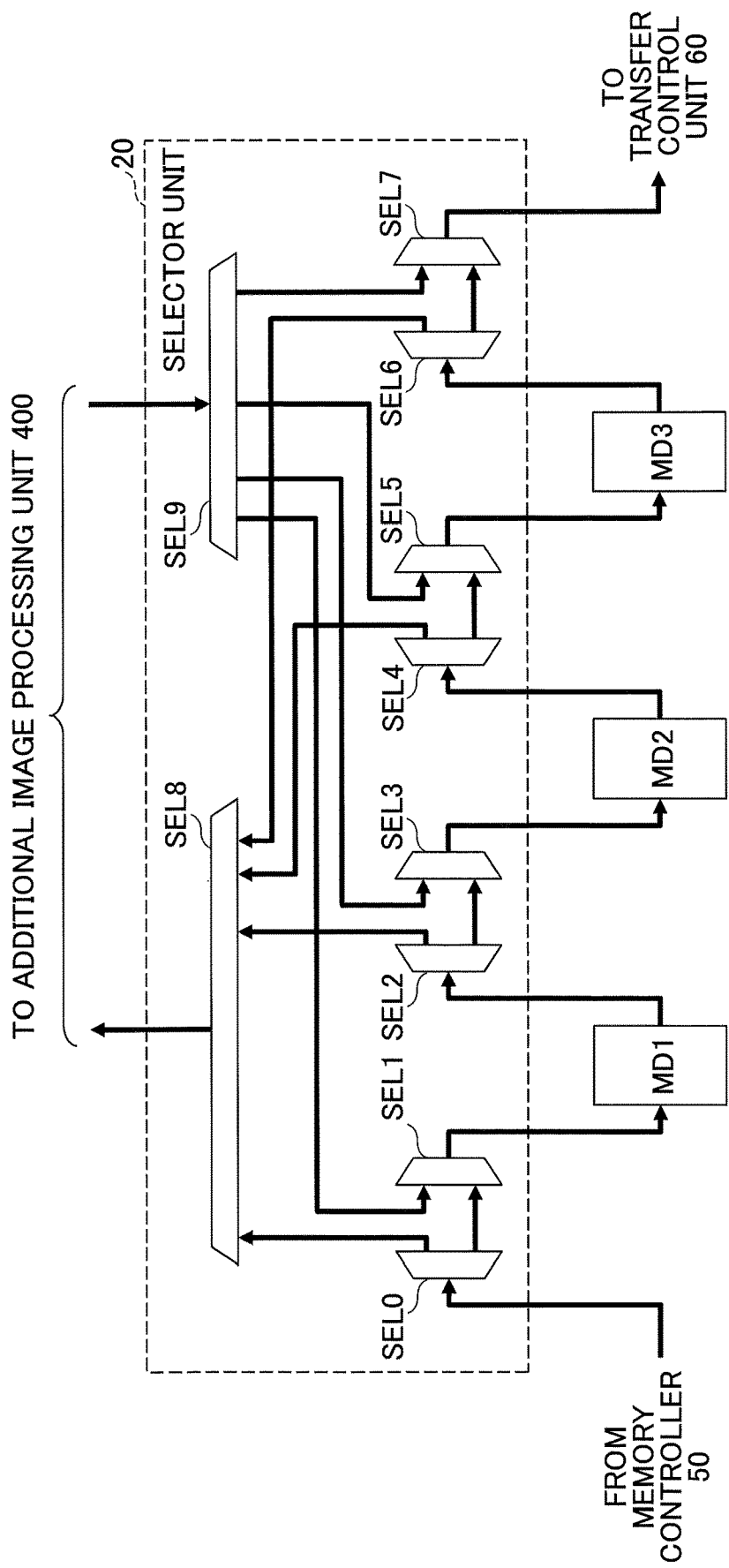
FIG. 2 is a block diagram illustrating an example of a selector unit of FIG. 1 according to an embodiment of the present invention.

The selector unit 20, which is an example of a connector, controls the connection of the image processing modules MD1 TO MD3 and further controls the connection of the additional image processing unit 400. An example of the selector unit 20 is illustrated in FIG. 2. In FIG. 1, the modules MD1 and MD2 are connected by a thick arrow, and the modules MD2 and MD3 are connected by a thick arrow. However, the modules MD1 and MD3 may be connected via the selector unit 20. A control signal represented by a dashed line may also be transmitted to the modules MD1 to MD3 via the selector unit 20.

The memory controller 50, which is an example of a memory controller, has a function for accessing the memory 120 mounted in the engine 100. The memory controller 50 writes the image data, which is received from the image reading unit 200, into the memory 120 one line at a time along the main scanning direction, reads the image data written in the memory 120 one line at a time, and outputs the image data to the image processing unit 10.

For example, the memory controller 50 reads image data corresponding to one line from the memory 120 upon receipt of a main scanning synchronization signal output enable OEN, and outputs the read image data together with a main scanning synchronization signal HSYNC0. The main scanning synchronization signal HSYNC0 indicates the output timing for each line of image data. The memory controller 50 outputs not only the main scanning synchronization signal HSYNC0, but also a sub scanning synchronization signal VSYNC0, when outputting image data corresponding to the first line of each document. The sub scanning synchronization signal VSYNC0 is a synchronization signal with respect to the sub scanning direction that is the feeding direction of a document read by the image reading unit 200, and for example, the sub scanning synchronization signal VSYNC0 is generated for each sheet of a document. The main scanning synchronization signal HSYNC0 is generated for each piece of image data corresponding to one line along the main scan direction that is perpendicular to the sub scanning direction. The memory 120 may be a Dynamic Random Access Memory, although not limited thereto.

The transfer control unit 60 controls high-speed serial transfer between the engine 100 and the controller 300. The functional expansion interface unit 70, which is an example of a second generator, has a function of controlling the communication with the additional image processing unit 400 and generating a main scanning synchronization signal output enable OEN2. The memory 72 included in the functional expansion interface unit 70 temporarily holds image data that has undergone image processing at the additional image processing unit 400. For example, the memory 72 may be a static random access memory (SRAM). The functional expansion interface unit 70 sets the main scanning synchronization signal output enable OEN2 to be in an enable state based on completion of writing image data corresponding to one line from the additional image processing unit 400 into the memory 72.

The additional image processing unit 400 is mounted on, for example, a printed circuit board or the like, and is detachably connected to the engine 100 via a connector (not illustrated) or the like. A semiconductor chip or a printed circuit board including the additional image processing unit 400 may be mounted directly to a printed circuit board on which the engine 100 is mounted. The additional image processing unit 400 is electrically connected to the engine 100 at the time of functional expansion of image processing.

For example, the additional image processing unit 400 is connected to the functional expansion interface unit 70 via transmission lines TX and RX of high-speed serial signals. The transmission line TX is used for transmitting image data from the functional expansion interface unit 70 to the additional image processing unit 400, and the transmission line RX is used for receiving, by the functional expansion interface unit 70, image data output from the additional image processing unit 400.

The additional image processing unit 400 includes an image processing unit 40 as an example of a second image processor and a transfer control unit 42. For example, the image processing unit 40 performs image processing on image data transferred from the engine 100, one line at a time. The transfer control unit 42 controls the reception of image data transferred from the engine 100, one line at a time, and controls the transfer of image data processed by the image processing unit 40 to the engine 100, one line at a time.

Although not particularly limited, image processing executed by the image processing unit 40 is more highly specialized than image processing performed by the module MD, and examples of image processing by the image processing unit 40 include forgery prevention processing and watermark processing. Users who use these types of image processing are limited, and, therefore, these types of image processing functions are preferably connected to the engine 100 as functional expansions (options) according to need, rather than being installed in the engine 100 as standard functions. Accordingly, the image processing by the image processing unit 40 can be provided only to a user who needs this image processing, so that the cost of the image processing apparatus 1 can be reduced. When installing a new image processing function after development of the image processing apparatus 1, the additional image processing unit 400 including the image processing unit 40 including the new image processing function may be connected to the image processing apparatus 1.

When the additional image processing unit 400 is not connected to the engine 100, that is, when functional expansion of image processing is not performed, the functional expansion interface unit 70 fixes the main scanning synchronization signal output enable OEN2 in an enable state.

The output enable generating unit 80, which is an example of a first generator, generates a main scanning synchronization signal output enable OEN1 based on delay information DLY generated by the image processing unit 10 based on the image processing status. For example, the delay information DLY indicates the timing of completion of the image processing in the image processing unit 10.

The output enable synthesizing unit 90, which is an example of an allower, generates a main scanning synchronization signal output enable OEN based on the main scanning synchronization signal output enable OEN1 from the output enable generating unit 80 and the main scanning synchronization signal output enable OEN2 from the functional expansion interface unit 70. For example, the output enable synthesizing unit 90 asserts the main scanning synchronization signal output enable OEN based on the main scanning synchronization signal output enable for which assert generation timing is later, among the main scanning synchronization signal output enable OEN1 and the main scanning synchronization signal output enable OEN2. The main scanning synchronization signal output enables OEN1, OEN2, and OEN are examples of allowance signals.

The main scanning synchronization signal output enable OEN is set to the enable state according to the main scanning synchronization signal output enable for which the transition timing to the enable state is later, among the main scanning synchronization signal output enable OEN1 and the main scanning synchronization signal output enable OEN2. Hereinafter, the main scanning synchronization signal output enables OEN, OEN1, and OEN2 are also referred to as simply output enables OEN, OEN1, and OEN2.

The CPU 130 controls the entire engine 100 by executing a control program stored in a memory (not illustrated). The function of setting the generation timing of the output enable OEN1 by the output enable generating unit 80 may be implemented by a control program executed by the CPU 130. The function of setting the generation timing of the output enable OEN2 by the functional expansion interface unit 70 may be implemented by a control program executed by the CPU 130. The function of setting the generation timing of the output enable OEN by the output enable synthesizing unit 90 may be implemented by a control program executed by the CPU 130.

FIG. 2 is a block diagram illustrating an example of the selector unit 20 of FIG. 1. The selector unit 20 includes a plurality of selectors SEL0 to SEL9 for determining the transfer path of image data transferred between the memory controller 50, the modules MD1, MD2, and MD3, the additional image processing unit 400, and the transfer control unit 60. The operations of the selectors SEL0 to SEL9 are controlled by a control program executed by the CPU 130.

By the operations of the selectors SEL0 to SEL9, it is possible to insert the image processing unit 40 at any point between the memory controller 50, the modules MD1 to MD3, and the transfer control unit 60. That is, by the selectors SEL0 to SEL9, the modules MD1 TO MD3 and the image processing unit 40 can be connected in series. The selector unit 20 may include a selector for selecting the transmission destination and the transmission source of a control signal such as a main scanning synchronization signal HSYNC0. The selector for selecting the transmission destination of the control signal may have a function for outputting the control signal to a plurality of transmission destinations in parallel.

The selector SEL0 transfers image data from the memory controller 50 toward the module MD1 or the additional image processing unit 400. The selector SEL1 transfers image data from the memory controller 50 or image data from the additional image processing unit 400 to the module MD1.

The selector SEL2 transfers image data from the module MD1 toward the module MD2 or the additional image processing unit 400. The selector SEL3 transfers image data from the module MD1 or image data from the additional image processing unit 400 to the module MD2.

The selector SEL4 transfers image data from the module MD2 toward the module MD3 or the additional image processing unit 400. The selector SEL5 transfers image data from the module MD2 or image data from the additional image processing unit 400 to the module MD3.

The selector SEL6 transfers image data from the module MD3 toward the transfer control unit 60 or the additional image processing unit 400. The selector SEL7 transfers image data from the module MD3 or image data from the additional image processing unit 400 to the transfer control unit 60.

The selector SEL8 transfers image data from any one of the memory controller 50 and the module MD1 TO MD3 toward the additional image processing unit 400. The selector SEL9 transfers image data from the additional image processing unit 400 to one of the modules MD1 to MD3 or to the transfer control unit 60.

Note that when the additional image processing unit 400 is not connected, the selector unit 20 illustrated in FIG. 2 connects the modules MD1, MD2, and MD3 in series between the memory controller 50 and the transfer control unit 60. However, the selector unit 20 may connect any module MD, which implements the function desired by the user, between the memory controller 50 and the transfer control unit 60, regardless of the connection/non-connection of the additional image processing unit 400.

In this case, for example, the selector unit 20 may include a selector for selecting the input of one of the modules MD1, MD2, and MD3 for connecting to the output of the memory controller 50. The selector unit 20 may include a selector for selecting the input of one of the modules MD2 and MD3 or the input of the transfer control unit 60 for connecting to the output of the module MD1. The selector unit 20 may include a selector for selecting either the input of the module MD3 or the input of the transfer control unit 60 for connecting to the output of the module MD2.

Figure 3:
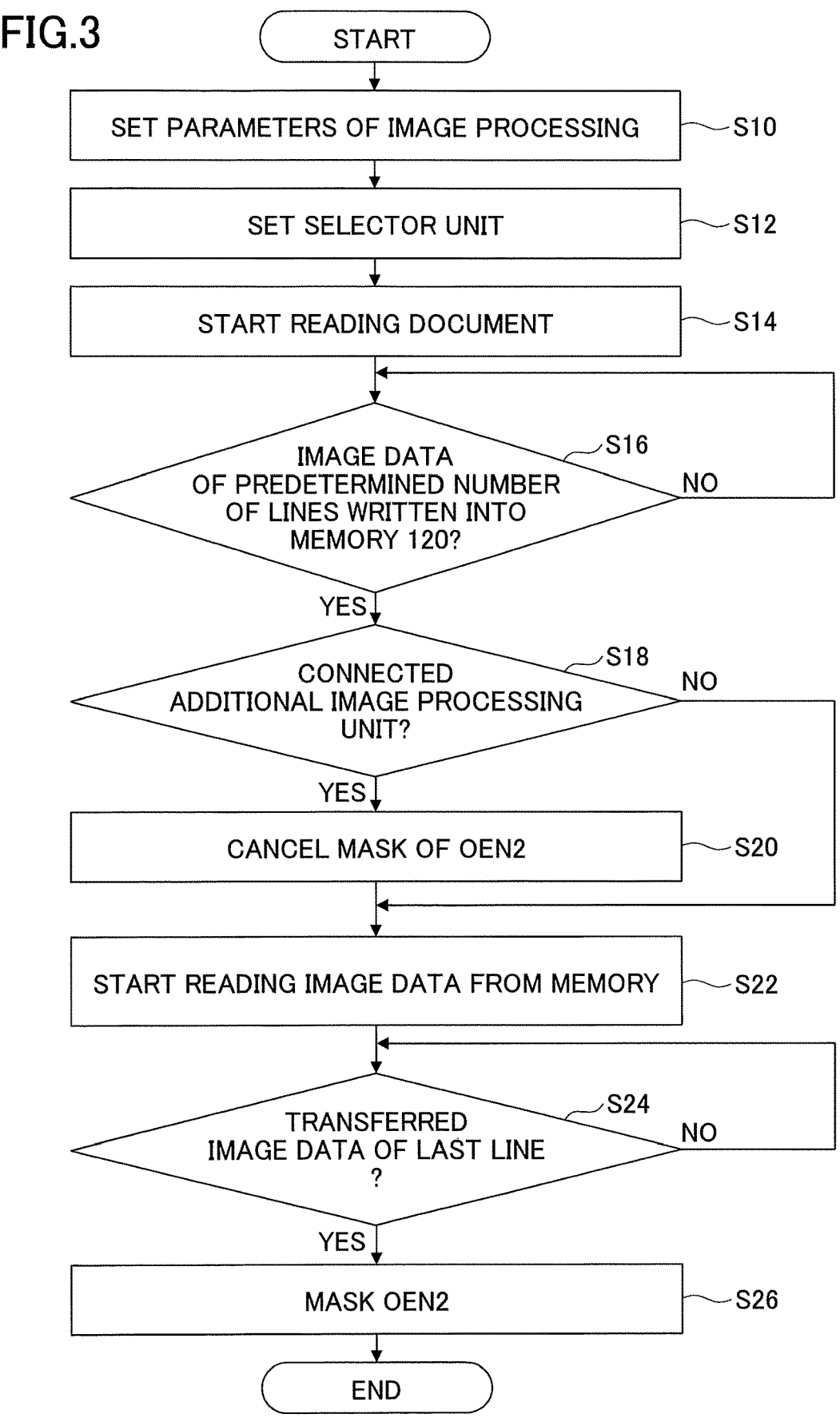
FIG. 3 is a flowchart illustrating an example of an operation of the image processing apparatus of FIG. 1 according to an embodiment of the present invention.

FIG. 3 is a flowchart illustrating an example of an operation of the image processing apparatus 1 of FIG. 1. That is, FIG. 3 illustrates an example of a control method of the image processing apparatus 1. The flowchart illustrated in FIG. 3 is implemented by operating the hardware in the image processing apparatus 1 based on control programs executed by the CPU 130. The flowchart illustrated in FIG. 3 is executed each time an operation of reading a document is executed. For example, in FIG. 3, both the front side and the back side of a document are read, but only one side may be read.

First, in step S10, the image processing apparatus receives, from a user operating the image processing apparatus 1, an instruction to perform image processing on image data obtained by reading a document, and sets various parameters related to the image processing to be executed. For example, the user specifies (selects) image processing to be performed on the image by operating a touch panel or the like mounted in the image processing apparatus 1.

Next, in step S12, the image processing apparatus 1 connects the module MD to be operated and the additional image processing unit 400 via the selector unit 20 based on image processing specified by the user.

Next, in step S14, the image processing apparatus 1 starts reading a document based on the pressing of a start button or the like as the user operates a touch panel. For example, the reading of the document is executed by reading, one line at a time, an image along the main scanning direction that is perpendicular to the sub scanning direction, while moving a CCD or the like or the document in the sub scanning direction that is the feeding direction of the document. Accordingly, the image data of the document is generated one line at a time. The memory controller 50 writes the generated image data one line at a time into the memory 120.

Next, in step S16, the image processing apparatus 1 waits until a predetermined number of lines of image data is written in the memory 120, and when the predetermined number of lines of image data is written in the memory 120, the process proceeds to step S18. By the process of step S16, it is possible to prevent a situation where there is a shortage of lines of image data to be read from the memory 120, during the image processing of image data.

In step S18, when the additional image processing unit 400 is connected to the engine 100, the image processing apparatus 1 proceeds to the process of step S20, and when the additional image processing unit 400 is not connected to the engine 100, the image processing apparatus 1 proceeds to the process of step S22. Note that in a case where the parameters are set in step S10 such that image processing is not executed by the additional image processing unit 400, even when the additional image processing unit 400 is connected to the engine 100, the process proceeds to step S22.

In step S20, the image processing apparatus 1 cancels the mask of the output enable OEN2 and proceeds to step S22. Here, a mask refers to a state where the output enable OEN2 is fixed to the enable state so that the output enable OEN is not affected by the output enable OEN2. Cancelling a mask refers to shifting to a state where the output enable OEN2 can be generated based on the state of image processing by the additional image processing unit 400. Note that the output enable OEN2 is in a masked state, i.e., fixed to an enable state, at the start of the flowchart.

In step S22, the image processing apparatus 1 starts reading the image data from the memory 120. The image processing apparatus 1 executes image processing, on one line at a time, by using at least one of the module MD selected by the selector unit 20 and the image processing unit 40. Examples in which the image processing apparatus 1 executes image processing are described with reference to FIGS. 4 to 6.

Next, in step S24, the image processing apparatus 1 waits until the image data of the last line of the document read by the image reading unit 200 is transferred to the memory controller 50, and when the transfer of the image data that has undergone image processing corresponding to one document is completed, the process proceeds to step S26. In step S26, the image processing apparatus 1 sets the output enable OEN2 to the masked state by fixing the output enable OEN2 to the enable state, and ends the operation of reading the document.

Figure 4:
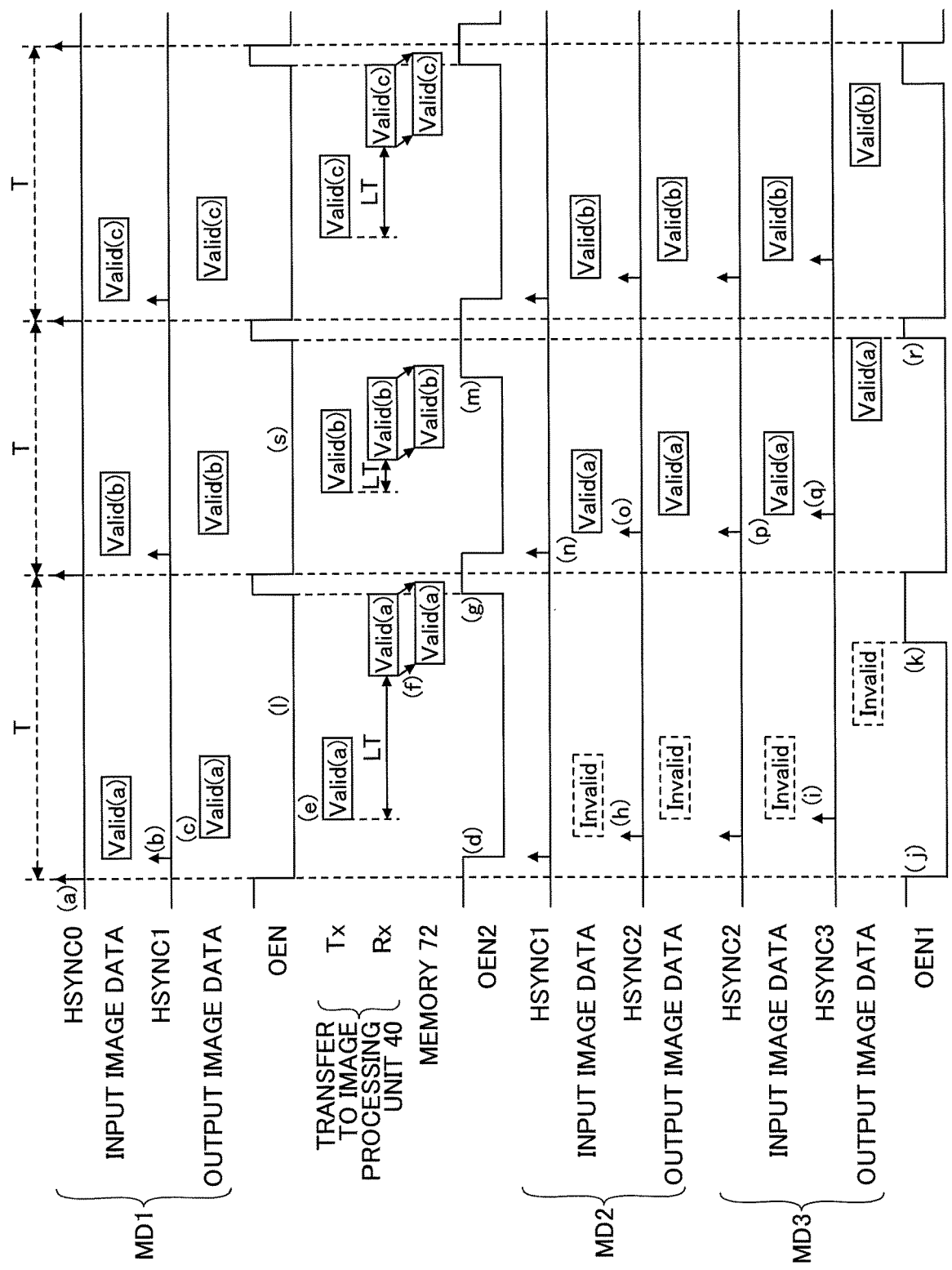
FIG. 4 is a timing diagram illustrating an example of an operation of the image processing apparatus of FIG. 1 according to an embodiment of the present invention.

FIG. 4 is a timing diagram illustrating an example of an operation of the image processing apparatus 1 in FIG. 1. FIG. 4 illustrates an operation when the module MD1, the image processing unit 40, and the modules MD2 and MD3 are connected in the stated order by the selector unit 20. In FIG. 4, the output interval of the main scanning synchronization signals HSYNC0 is indicated by a cycle T. The cycle T is the basic cycle during which image processing of image data of one line is executed, and is a variable cycle that varies depending on the image processing time. When the additional image processing unit 400 is connected to the engine 100, image processing of image data of one line is executed by using two cycles T, where one cycle T is used for executing image processing of image data of one line when the additional image processing unit 400 is not connected to the engine 100.

"Valid" indicated in a rectangle of solid lines indicates that image data (line data in the main scanning direction) generated by reading a document is valid, and a code indicated in parenthesis within the rectangle indicates a particular line (line a, line b, line c, or line d). Lines a, b, c, and d are lines arranged in this order in the sub scanning direction. "Invalid" indicated in a rectangle of dashed lines indicates that image data is invalid.

In the example of FIG. 4, the latency LT of image processing by the image processing unit 40 of the additional image processing unit 400 differs for each of the lines a, b, and c, with line a having the largest latency LT and line b having the smallest latency LT. In FIG. 4, the latency LT is defined as the period from the output of the image data to the transmission line TX to reception of the image data by the transmission line RX. Incidentally, the latency LT may vary due to variations in the bandwidth of the transmission line TX and the transmission line RX.

First, the module MD1 receives the synchronization signal HSYNC0 and the image data of line a that is output from the memory controller 50 ((a) in FIG. 4). The module MD1 outputs the synchronization signal HSYNC1 based on the start of image processing on the input image data, sequentially executes image processing on each pixel of line a, and sequentially outputs the image data as output image data ((b) and (c) in FIG. 4). The synchronization signal HSYNC1 is supplied to the module MD2 and the functional expansion interface unit 70. Hereinafter, the main scanning synchronization signals HSYNC0, HSYNC1, etc., are also referred to as synchronization signals HSYNC.

The functional expansion interface unit 70 negates the output enable OEN2 to a low level in response to the synchronization signal HSYNC1 ((d) in FIG. 4). The output enable OEN that is at a low level is in a disable state and indicates a state in which reading of image data from the memory 120 by the memory controller 50 is not allowed. Here, the synchronization signal that negates the output enable OEN2 is the main scanning synchronization signal HSYNC output by the module MD connected to the input side of the image processing unit 40. The main scanning synchronization signal HSYNC output by the module MD is generated based on the main scanning synchronization signal HSYNC0 output by the memory controller 50. When the input of the image processing unit 40 is directly connected to the memory controller 50, the synchronization signal that negates the output enable OEN2 is the main scanning synchronization signal HSYNC0.

The functional expansion interface unit 70 receives image data of one line that has undergone image processing by the module MD1, via the selector unit 20, and outputs the received image data to the image processing unit 40 of the additional image processing unit 400 via the transmission line TX ((e) in FIG. 4). The image processing unit 40 executes image processing on the received image data and transmits the image data generated by the image processing to the functional expansion interface unit 70 via the transmission line RX.

The functional expansion interface unit 70 sequentially writes the received image data to the memory 72 each time the image data (pixel data) is received from the image processing unit 40 ((f) in FIG. 4). The functional expansion interface unit 70 asserts the output enable OEN2 to a high level in response to completion of reception of image data of one line from the image processing unit 40 ((g) in FIG. 4). The output enable OEN2 at the high level is in an enable state and indicates a state in which the memory controller 50 is allowed to read image data from the memory 120.

As described above, the output enable OEN2 is negated (not allowed) based on the synchronization signal HSYNC, and is asserted (allowed) based on the completion of reception of the image data from the image processing unit 40. Therefore, during image processing by the image processing unit 40, the reading of the image data of the next line from the memory 120 is prohibited. Therefore, even when the image processing time by the image processing unit 40 varies, it is possible to reliably prohibit the reading of the image data of the next line from the memory 120 during image processing by the image processing unit 40.

On the other hand, the module MD2 starts the execution of image processing of dummy image data based on the reception of the synchronization signal HSYNC1 and outputs the synchronization signal HSYNC2 ((h) in FIG. 4). The module MD3 starts the execution of image processing of the dummy image data based on the reception of the synchronization signal HSYNC2 and outputs the synchronization signal HSYNC3 ((i) in FIG. 4).

The output enable generating unit 80 negates the output enable OEN1 to a low level in response to the synchronization signal HSYNC0 ((j) in FIG. 4). The output enable generating unit 80 detects the completion of the transfer of the output image data by the module MD3 based on the delay information DLY (not illustrated) and asserts the output enable OEN1 to a high level ((k) in FIG. 4). The output enable OEN1 at a low level is in a disable state and indicates that the memory controller 50 is not allowed to read image data from the memory 120. The output enable OEN1 at a high level is in an enable state and indicates that the memory controller 50 is allowed to read image data from the memory 120.

When no valid image data is received, image processing is executed by using dummy image data, so that the image processing unit 10 can output the delay information DLY to the output enable generating unit 80 as in the case where valid image data is processed. Accordingly, the output enable generating unit 80 can assert the output enable OEN1 as in the case of processing valid image data. On the other hand, if image processing were not executed by using dummy image data, the image processing unit 10 would not be able to output the delay information DLY, and the output enable generating unit 80 would not be able to assert the output enable OEN1. As a result, the output enable synthesizing unit 90 would continue to wait for the output enable OEN1 to be asserted after the output enable OEN2 is asserted, and would consequently fall into a deadlock state. That is, by executing image processing by using dummy image data, it is possible to prevent malfunctions of the image processing apparatus 1.

For example, the output enable synthesizing unit 90 takes OR of the negative logic of the output enable OEN1 and the output enable OEN2 and outputs this as the output enable OEN ((1) in FIG. 4). Accordingly, in the example of FIG. 4, the timing of asserting the output enable OEN, which is a timing for allowing the reading of image data from the memory 120 by the memory controller 50, can be adjusted to match the output enable OEN2 for which assert timing is later.

The operation of the module MD1 in the second cycle is the same as that of the first cycle, and the operation of the image processing unit 40 is the same as that of the first cycle, except that the processing time of processing the image data is shorter than that of the first cycle. The functional expansion interface unit 70 asserts the output enable OEN2 in response to completion of reception of image data of one line from the image processing unit 40 ((m) in FIG. 4).

On the other hand, in the second cycle, the modules MD2 and MD3 sequentially execute image processing by using the image data of line a generated by the image processing unit 40 in the first cycle. The module MD2 receives image data of line a held by the memory 72 together with the main scanning synchronization signal HSYNC1 output from the module MD1, starts image processing, and outputs the main scanning synchronization signal HSYNC2 ((n) and (o) in FIG. 4). For example, the functional expansion interface unit 70 reads the image data from the memory 72 based on the synchronization signal HSYNC0, which is the start timing of the second cycle T, and outputs the read image data to the module MD2 at a timing matching the synchronization signal HSYNC1.

As described above, when the additional image processing unit 400 is connected to the engine 100, image processing is executed by using two cycles T. For this reason, in the second cycle T, image processing of the image data of line a is executed by the modules MD2 and MD3 in parallel with image processing of the image data of line b by the module MD1 and the image processing unit 40. In this case also, by allowing the reading of the image data of the next line at a timing matching the later one of the output enable OEN1 and the output enable OEN2, each module MD can always start processing the image based on a predetermined main scanning synchronization signal HSYNC.

The image data generated by the image processing unit 40 is buffered in the memory 72, and, therefore, even when the cycle T varies, the module MD2 can receive the image data at a timing matching the synchronization signal HSYNC1 and execute image processing. In other words, even when the additional image processing unit 400 is connected to the engine 100 and image processing is executed across a plurality of cycles T, the deviation of timing caused by the variation of the leading cycle T can be adjusted and image processing in the subsequent cycle T can always be started at the same timing. As a result, it is possible to prevent abnormal images from being generated due to deviation of timing caused by executing the image processing is executed across a plurality of cycles T.

The module MD3 receives image data together with the main scanning synchronization signal HSYNC2 output from the module MD2, starts image processing, and outputs the main scanning synchronization signal HSYNC3 ((p) and (q) in FIG. 4). The output enable generating unit 80 asserts the output enable OEN1 in response to the completion of the transfer of the output image data by the module MD3 ((r) in FIG. 4).

The output enable synthesizing unit 90 asserts the output enable OEN at a timing matching the output enable OEN1 for which the assert timing is later among the output enable OEN1 and the output enable OEN2 ((s) in FIG. 4).

The operation of the third cycle T is similar to the operation of the second cycle, except that the timing of asserting the output enable OEN is adjusted to be at a timing matching the output enable OEN2. As illustrated in FIG. 4, when the timing of receiving image data from the image processing unit 40 varies, the functional expansion interface unit 70 asserts the output enable OEN2 at a timing matching the timing when receiving is completed. The output enable synthesizing unit 90 determines the assert timing of the output enable OEN to be output to the memory controller 50, to be at a timing matching the output enable for which the assert timing is later, among the output enable OEN1 and the output enable OEN2. Accordingly, even when the timing of receiving image data from the additional image processing unit 400 varies, normal image processing can always be executed.

Figure 5:
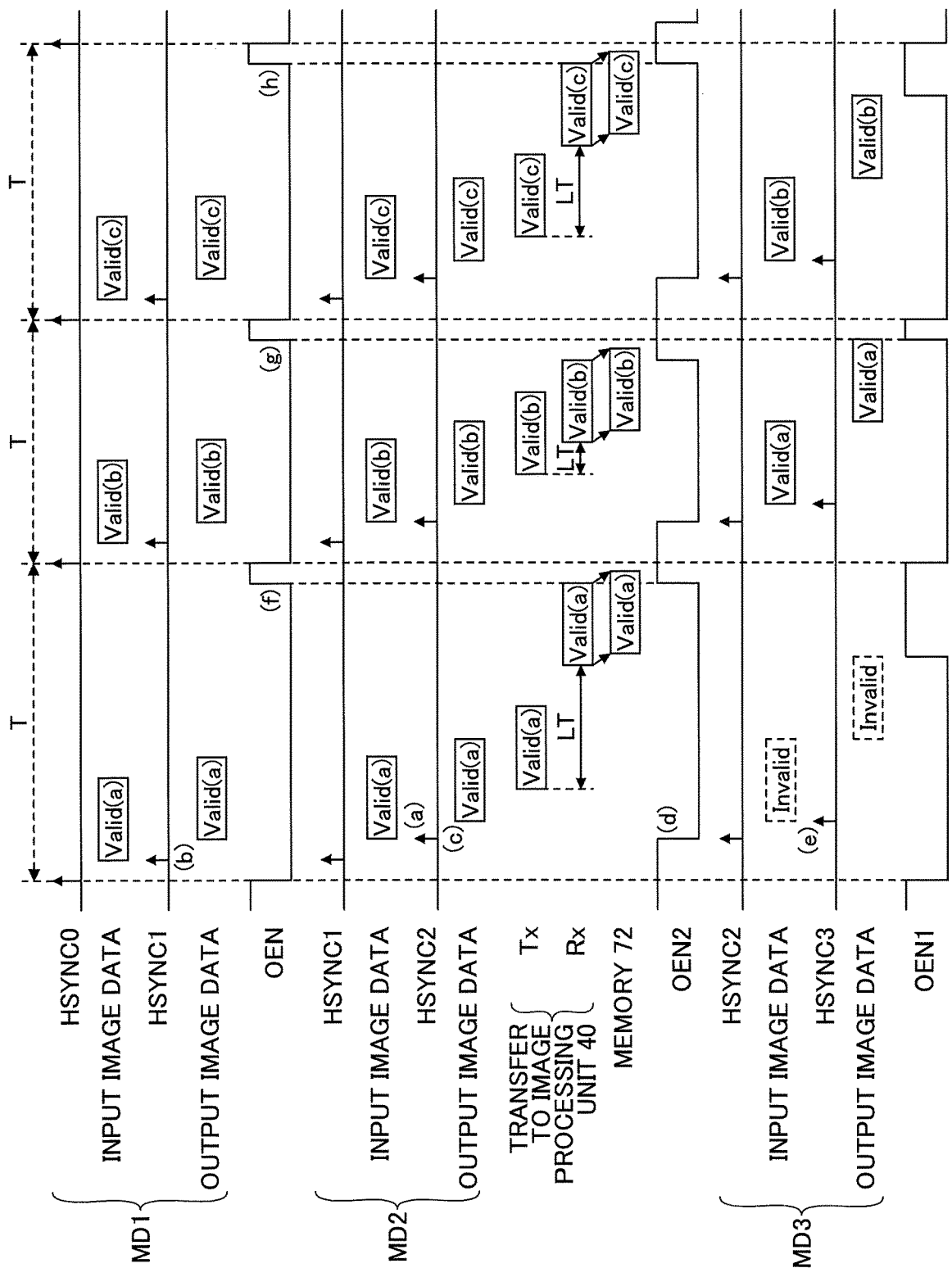
FIG. 5 is a timing diagram illustrating another example of the operation of the image processing apparatus of FIG. 1 according to an embodiment of the present invention.

FIG. 5 is a timing diagram illustrating another example of an operation of the image processing apparatus 1 of FIG. 1. For the same operations as those in FIG. 4, detailed descriptions will be omitted. FIG. 5 illustrates an operation when the modules MD1 and MD2, the image processing unit 40, and the module MD3 are connected in the stated order by the selector unit 20. Also in FIG. 5, similarly to FIG. 4, when the additional image processing unit 400 is connected to the engine 100, image processing of image data of one line is executed by using two cycles T, where one cycle T is used for executing image processing of image data of one line when the additional image processing unit 400 is not connected to the engine 100. With respect to the latency LT of image processing by the image processing unit 40 of the additional image processing unit 400, as in FIG. 4, line a has the largest latency LT and line b has the smallest latency LT.

In FIG. 5, the module MD2 receives the valid image data from the module MD1 and executes image processing in the first cycle T ((a) in FIG. 5). Regardless of the position to which the image processing unit 40 is connected, the synchronization signal HSYNC1 is output from the module MD1 to the module MD2, and the synchronization signal HSYNC2 is output from the module MD2 to the module MD3 ((b) and (c) in FIG. 5). In FIG. 5, the functional expansion interface unit 70 negates the output enable OEN2 to a low level in response to the synchronization signal HSYNC2 ((d) in FIG. 5).

The module MD3 does not receive valid image data from the image processing unit 40 in the first cycle T, and, therefore, the module MD3 starts image processing on dummy image data based on the synchronization signal HSYNC2 ((e) in FIG. 5). Similar to FIG. 4, in the first cycle T, the output enable OEN is asserted based on the output enable OEN2 ((f) in FIG. 5). In the second cycle T, the output enable OEN is asserted based on the output enable OEN1 ((h) in FIG. 5). In the third cycle T, the output enable OEN is asserted based on the output enable OEN2 ((h) in FIG. 5).

Also in FIG. 5, the output enable synthesizing unit 90 determines the assert timing of the output enable OEN to be output to the memory controller 50, to be at a timing matching the output enable for which the assert timing is later, among the output enable OEN1 and the output enable OEN2. Accordingly, regardless of the position to which the additional image processing unit 400 is connected, even when the timing of receiving image data from the additional image processing unit 400 varies, normal image processing can always be executed.

Figure 6:
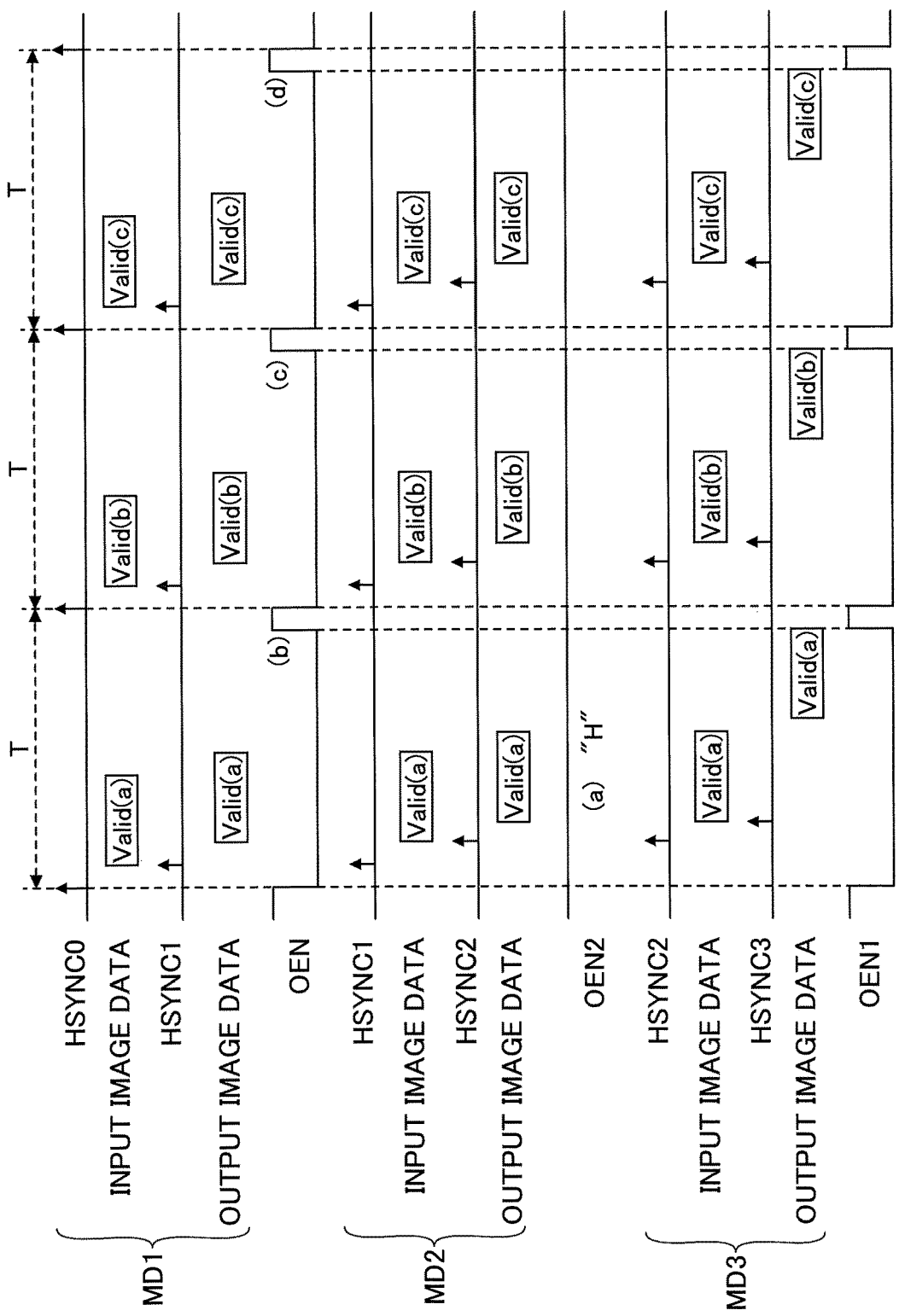
FIG. 6 is a timing diagram illustrating yet another example of the operation of the image processing apparatus of FIG. 1 according to an embodiment of the present invention.

FIG. 6 is a timing diagram illustrating yet another example of the operation of the image processing apparatus 1 of FIG. 1. For the same operations as those in FIG. 4, detailed descriptions will be omitted. In FIG. 6, the additional image processing unit 400 is not connected to the engine 100. That is, FIG. 6 illustrates an operation when the modules MD1, MD2, and MD3 are connected in the stated order by the selector unit 20. When the additional image processing unit 400 is not connected to the engine 100, image processing of image data of one line is executed by using one cycle T.

The functional expansion interface unit 70 has a function of detecting whether the additional image processing unit 400 is connected to the engine 100. When it is detected that the additional image processing unit 400 is not connected to the engine 100, the functional expansion interface unit 70 fixes the output enable OEN2 to a high-level "H" (enable state) ((a) in FIG. 6). In this case, the output enable synthesizing unit 90 generates the output enable OEN based only on the output enable OEN1 from the output enable generating unit 80 ((b), (c), and (d) in FIG. 6).

The operations of the modules MD2 and MD3 are the same as those of the modules MD2 and MD3 in the second cycle T in FIG. 4. The timings of generating the synchronization signals HSYNC1, HSYNC2, and HCYNC3 are not changed regardless of whether the additional image processing unit 400 is connected. Therefore, the timings of the operations of the modules MD1, MD2, and MD3 are not changed regardless of whether the additional image processing unit 400 is connected. Accordingly, regardless of the number of cycles T that are taken for the processing time of the image data, the image processing can be normally executed.

Figure 7:
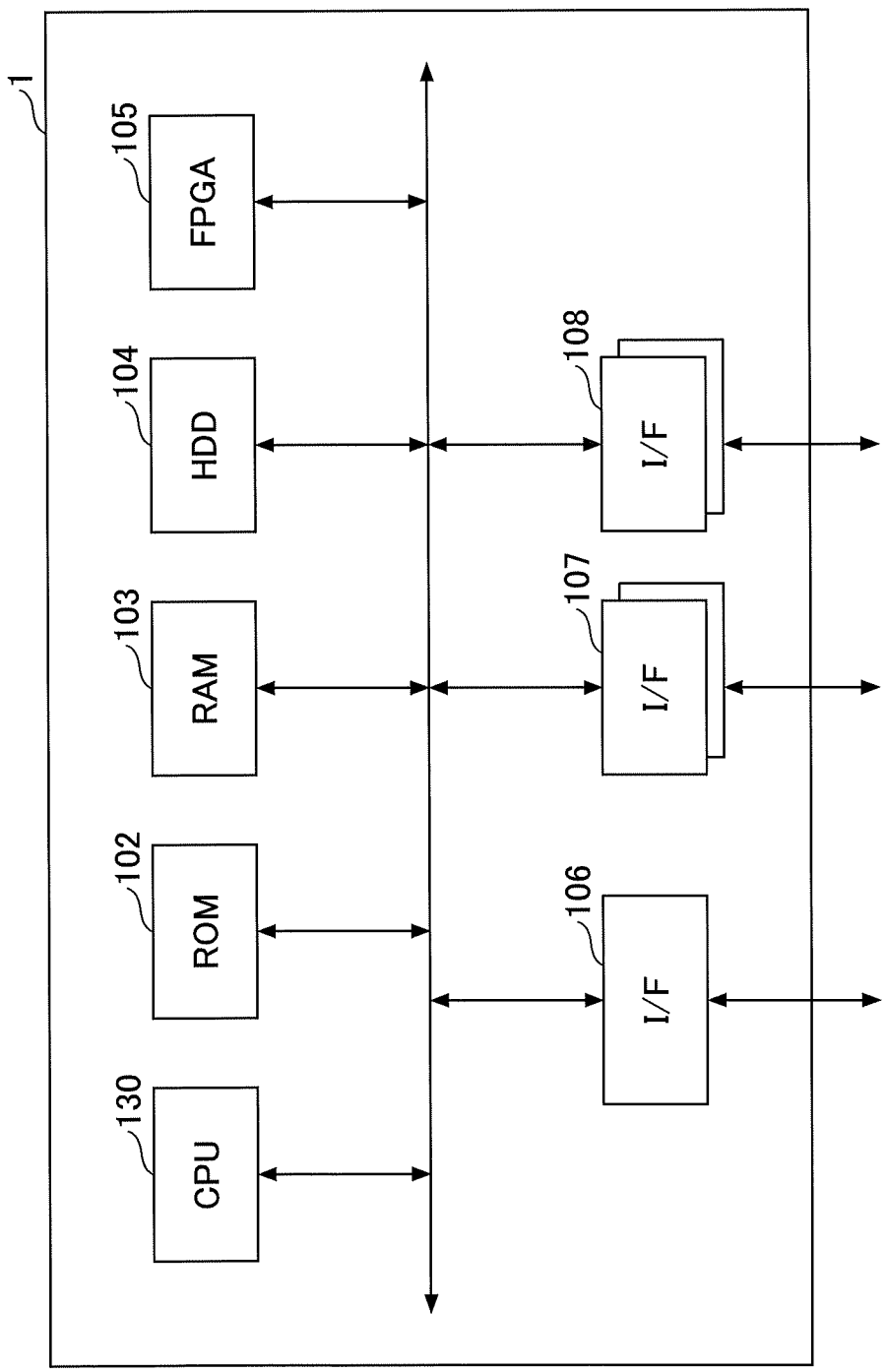
FIG. 7 is a hardware configuration diagram of the image processing apparatus of FIG. 1 according to an embodiment of the present invention.

FIG. 7 is a hardware configuration diagram illustrating the image processing apparatus 1 in FIG. 1. The image processing apparatus 1 includes the CPU 130, a read-only memory (ROM) 102, a random access memory (RAM) 103, a hard disk drive (HDD) 104, a Field Programmable Gate Array (FPGA) 105, a communication interface (I/F) 106, and input/output (I/O) interfaces (I/F) 107 and 108.

For example, the communication I/F 106 is a Peripheral Component Interconnect (PCI) interface. The I/O I/F 107 is connected to an input device such as a touch panel or various buttons, or is connected to a display device such as a liquid crystal display. The I/O I/F 108 is an interface for connecting a recording medium such as a digital versatile disc (DVD), a Compact Disk Read-Only Memory (CD-ROM), or a Universal Serial Bus (USB) memory. In the recording medium, control programs for controlling the operations of the image processing apparatus 1 may be stored. In this case, the CPU 130 executes a control program transferred from the recording medium to the HDD 104 or the like.

The CPU 130 implements the functions of the image processing apparatus 1 by executing control programs stored in the ROM 102 or a recording medium. The RAM 103 may include the memory 120 or the memory 72 illustrated in FIG. 1. At least a portion of the hardware of the main image processing unit 110 illustrated in FIG. 1 may be constructed in the FPGA 105.

Figure 8:
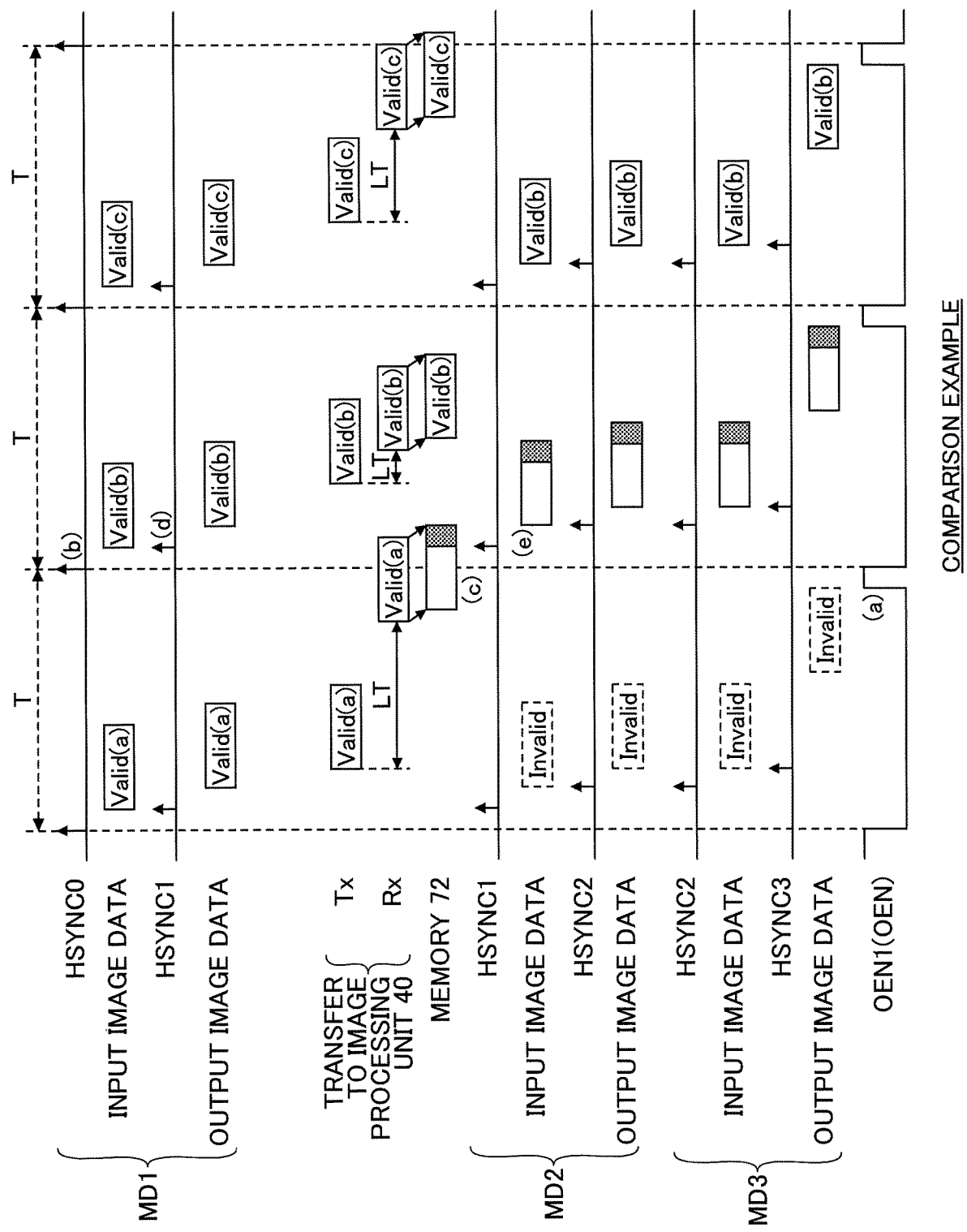
FIG. 8 is a timing diagram illustrating an example (comparison example) of an operation of another image processing apparatus.

FIG. 8 is a timing diagram illustrating an example of an operation of another image processing apparatus (comparison example). The other image processing apparatus does not include the output enable synthesizing unit 90 illustrated in FIG. 1, and the functional expansion interface unit 70 does not have the function of generating the output enable OEN2. The output enable OEN1 generated by the output enable generating unit 80 is supplied to the memory controller 50 as the output enable OEN. Other configurations and functions of the image processing apparatus of this comparison example are the same as those of the image processing apparatus 1 illustrated in FIG. 1.

Similar to FIG. 4, FIG. 8 illustrates an operation when the module MD1, the image processing unit 40, and the modules MD2 and MD3 are connected in the stated order by the selector unit 20. When the additional image processing unit 400 is connected to the engine 100, image processing of image data of one line is executed by using two cycles T, where one cycle T is used for executing image processing of image data of one line when the additional image processing unit 400 is not connected to the engine 100. With respect to the latency LT of image processing by the image processing unit 40 of the additional image processing unit 400, as in FIG. 4, line a has the largest latency LT and line b has the smallest latency LT.

In the first cycle T, the output enable generating unit 80 detects the completion of the transfer of the dummy output image data by the module MD3 and asserts the output enable OEN1 to a high level ((a) in FIG. 8). The memory controller 50 reads image data of the next line from the memory 120 based on the asserting of the output enable OEN1 (OEN) from the output enable generating unit 80 and outputs the image data together with the synchronization signal HSYNC0 ((b) in FIG. 8). By the output of the synchronization signal HSYNC0, the second cycle T is started.

The functional expansion interface unit 70 sequentially receives image data that has undergone image processing from the image processing unit 40 in a period spanning across the first and second cycles T and writes the received image data into the memory 72 ((c) in FIG. 8).

The module MD1 generates the synchronization signal HSYNC1 based on the synchronization signal HSYNC0 and starts image processing of line b ((d) in FIG. 8). The module MD2 receives image data of one line from the memory 72 based on the synchronization signal HSYNC1 and starts image processing of the line a ((e) in FIG. 8). However, at the time when the synchronization signal HSYNC1 is output, the image data generated by the image processing unit 40 is not yet stored in the shaded portion of the memory 72. Therefore, the modules MD2 and MD3 cannot execute image processing by using the correct image data, and the image processing apparatus 1 malfunctions.

When the storage of the image data generated by the image processing unit 40 in the memory 72 is completed before the synchronization signal HSYNC1 is output, no malfunction occurs. In the operations illustrated in FIG. 4 and FIG. 5, the assert timing of the output enable OEN is changed according to the time taken for the image processing executed by the image processing unit 40. Therefore, the image data generated by the image processing unit 40 is stored in the memory 72 before the synchronization signal HSYNC1 is output, and, therefore, no malfunction occurs.

As described above, in the embodiments illustrated in FIGS. 1 to 7, when the additional image processing unit 400 is connected to the engine 100, the assert timing of the output enable OEN2 is adjusted according to the processing time of the image data by the image processing unit 40. For example, the output enable synthesizing unit 90 asserts the output enable OEN at a timing matching the output enable for which the assert timing is later, among the output enable OEN1 and the output enable OEN2. Accordingly, even when the image processing time varies according to whether functional expansion is implemented, abnormal image data will not be generated and it is possible to prevent the degradation of the transfer performance of the image data.

The functional expansion interface unit 70 negates the output enable OEN2 in response to the synchronization signal HSYNC1 and asserts the output enable OEN2 in response to the completion of reception of image data of one line from the image processing unit 40. Accordingly, even when the image processing time by the image processing unit 40 varies, reading of image data of the next line from the memory 120 during image processing by the image processing unit 40 can be reliably prohibited.

Further, because the output enable OEN2 is asserted in response to completion of reception of the image data from the image processing unit 40, it is possible to prevent the output enable OEN2 from being asserted during reception of the image data. As a result, even when the image processing time by the image processing unit 40 varies, the negate period of the output enable OEN2 can be minimized and abnormal images are prevented from being generated.

The image data generated by the image processing unit 40 is temporarily stored in the memory 72, and then transferred from the memory 72 to a subsequent module MD. Therefore, even when the cycle T varies, the subsequent module MD can receive image data at a timing matching the synchronization signal HSYNC and execute image processing.

In other words, even when the additional image processing unit 400 is connected to the engine 100 and image processing is executed across a plurality of cycles T, the deviation of timing due to the variation of the leading cycle T can be adjusted and image processing in the subsequent cycles T can always be started at the same timing. That is, at each cycle T, the timing of starting image processing by each module MD can be constant regardless of whether the additional image processing unit 400 is connected. As a result, it is possible to prevent abnormal images from being generated due to deviation of timing caused by the image processing being executed across a plurality of cycles T.

When no valid image data is received, image processing is executed by using dummy image data, so that the image processing unit 10 can output the delay information DLY to the output enable generation unit 80 as in the case where valid image data is processed. Accordingly, the output enable OEN1 can be asserted as in the case of processing valid image data, and it is possible to prevent malfunctions of the image processing apparatus 1 caused by the output enable OEN1 not being asserted.

Figure 9:
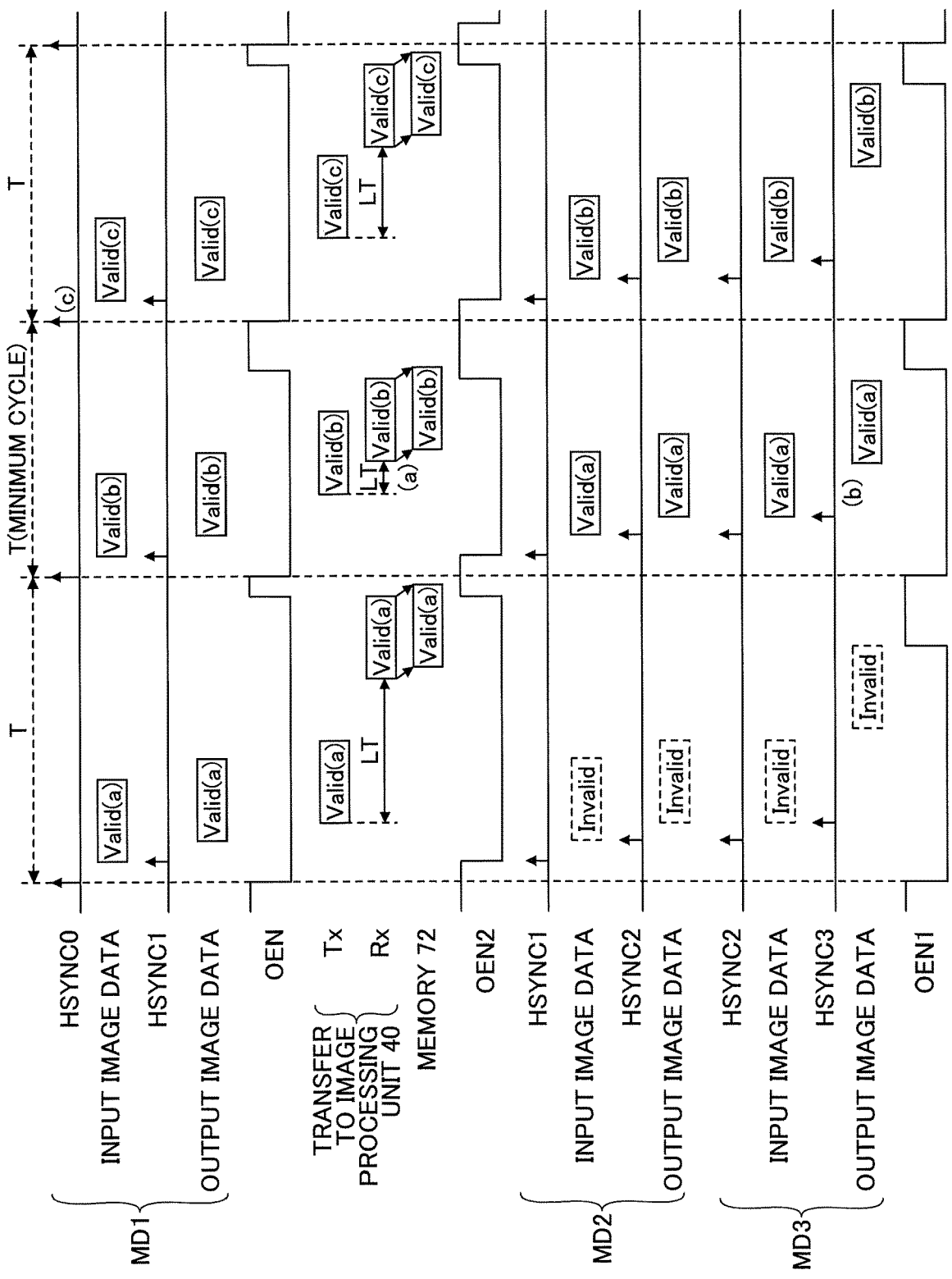
FIG. 9 is a timing diagram illustrating an example of an operation of an image processing apparatus according to another embodiment of the present invention.

FIG. 9 is a timing diagram illustrating an example of an operation of an image processing apparatus according to another embodiment of the present invention. For the configurations, functions, and operations similar to the configurations, functions, and operations illustrated in FIGS. 1 to 7, detailed descriptions will be omitted. The image processing apparatus executing the operation illustrated in FIG. 9 is the same as the image processing apparatus 1 illustrated in FIG. 4, except that the functions of the memory controller 50 are different. Similar to FIG. 4, FIG. 9 illustrates an operation when the module MD1, the image processing unit 40, and the modules MD2 and MD3 are connected in the stated order by the selector unit 20.

When the cycle T set according to the output enable OEN (the cycle of generating the synchronization signal HSYNC0) is smaller than a minimum cycle that is set in advance, the memory controller 50 outputs the synchronization signal HSYNC0 in accordance with the minimum cycle. The operations of the first and third cycles of FIG. 9 are the same as those of the first and third cycles of FIG. 4.

In the second cycle T, the processing time of the image data by the image processing unit 40 and the processing time of the image data by the modules MD2 and MD3 are shorter than the processing time of the other cycles T ((a) and (b) in FIG. 9). Therefore, when the synchronization signal HSYNC0 is generated based on the output enable OEN, the second cycle T will become shorter than the minimum cycle. In this case, the memory controller 50 outputs the synchronization signal HSYNC0 in accordance with the minimum cycle ((c) in FIG. 9). Accordingly, even if the output enable OEN is asserted earlier, it is possible to prevent one cycle from becoming shorter than the specified cycle (i.e., the minimum cycle). As a result, it is possible to prevent a shortage in the timing margin of the circuit in the main image processing unit 110, and malfunctions of the main image processing unit 110 can be prevented.

Figure 10:
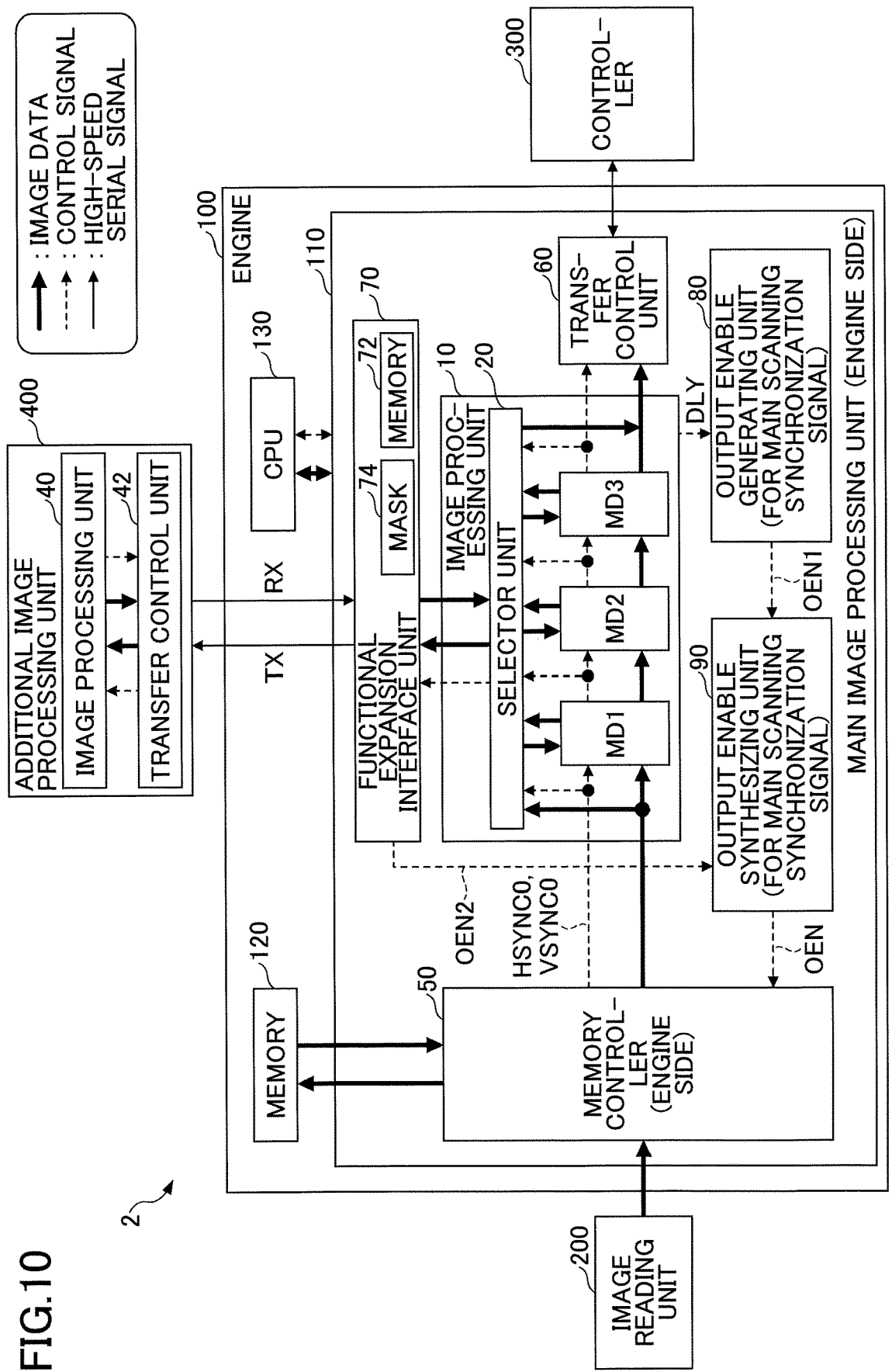
FIG. 10 is a block diagram illustrating an image processing apparatus according to yet another embodiment of the present invention.

FIG. 10 is a block diagram illustrating an image processing apparatus according to another embodiment of the present invention. For the configurations, functions, and operations similar to the configurations, functions, and operations illustrated in FIGS. 1 to 7, detailed descriptions will be omitted. In an image processing apparatus 2 illustrated in FIG. 10, the functional expansion interface unit 70 includes a mask control unit (mask) 74. Other configurations and functions of the image processing apparatus 2 are the same as the configurations and functions of the image processing apparatus 1 illustrated in FIG. 1.

When the image processing time by the image processing unit 40 extends across n cycles (n is an integer of two or more), the mask control unit 74 forcibly sets the output enable OEN2 to the assert level from the reading of the document to the n−1th cycle. The processing time of the image data by the image processing unit 40 may be calculated by the CPU 130 when the additional image processing unit 400 is connected to the engine 100 or may be calculated by the CPU 130 each time a document is read. The CPU 130 reports, to the mask control unit 74, the calculated processing time of the image data as the number of cycles.

The CPU 130 may store the calculated number of cycles in a register that can be referred to by the mask control unit 74. Further, without providing the mask control unit 74, an I/O register for forcibly setting the output enable OEN2 to the assert state may be provided, and the CPU 130 may write, in the I/O register, a value for setting the output enable OEN2 to the assert state for a period corresponding to the calculated number of cycles.

Figure 11:
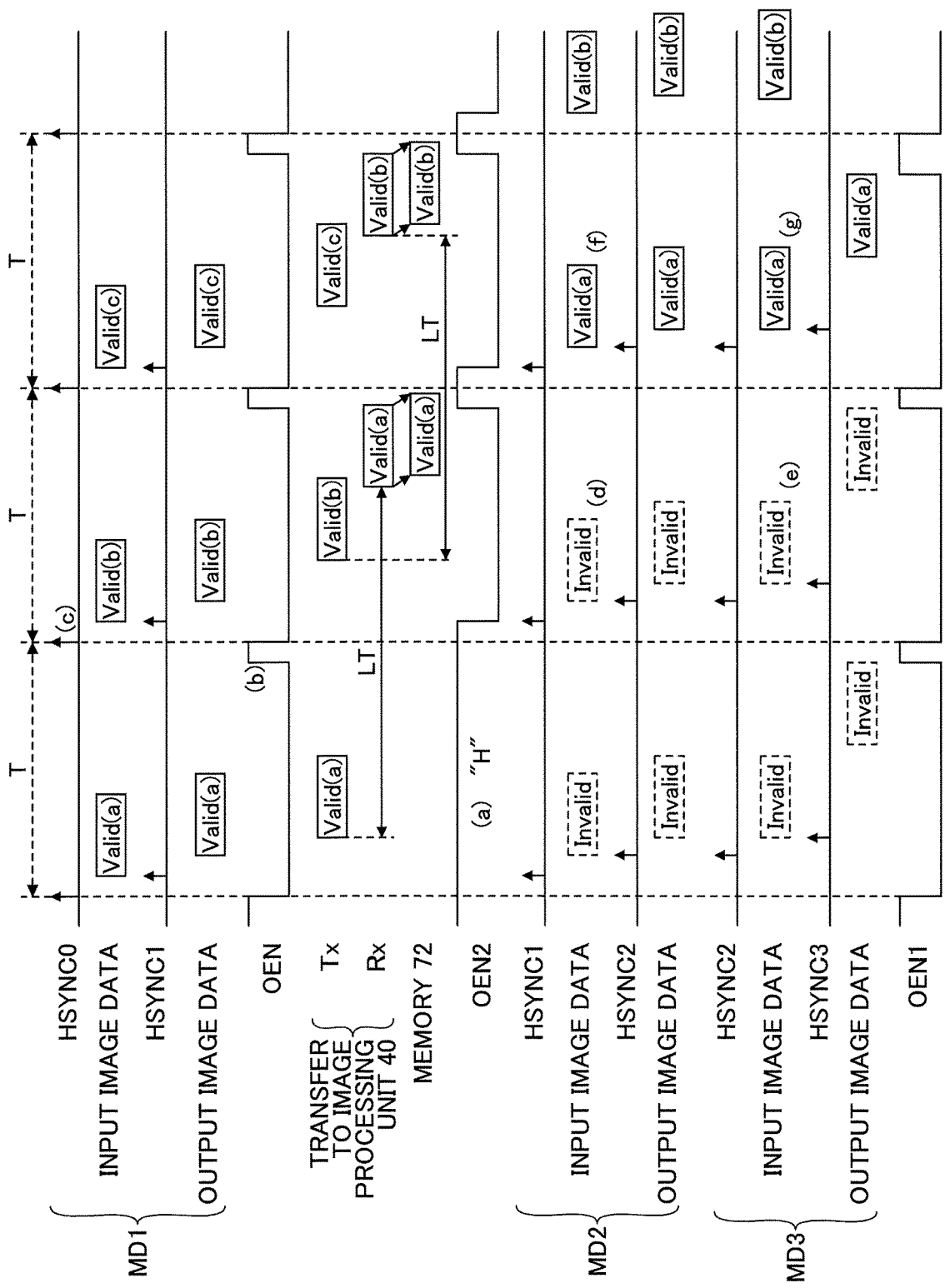
FIG. 11 is a timing diagram illustrating an example of an operation of the image processing apparatus of FIG. 10 according to the other embodiment of the present invention.

FIG. 11 is a timing diagram illustrating an example of an operation of the image processing apparatus 2 of FIG. 10. For the same operations as in FIG. 4, detailed descriptions will be omitted. Similar to FIG. 4, FIG. 11 illustrates an operation when the module MD1, the image processing unit 40, and the modules MD2 and the MD3 are connected in the stated order by the selector unit 20. The CPU 130 reports, to the mask control unit 74 in advance, that one line of image processing performed by the image processing unit 40 will be executed across two cycles (n=2).

Based on the report from the CPU 130, the mask control unit 74 maintains the output enable OEN2 at a high level "H" in the first cycle T after reading the document ((a) in FIG. 11). The first cycle T after reading the document, corresponds to the cycles T excluding the last cycle T among the cycles used for executing image processing on one line, and include the cycles up to the n−1th cycle T. For example, when image processing of one line by the image processing unit 40 takes four cycles (n=4), the mask control unit 74 sets the output enable OEN2 to a high level "H" for the first three cycles (=n−1) after reading the document.

The output enable OEN2 is fixed to a high level, and, therefore, the output enable synthesizing unit 90 asserts the output enable OEN in synchronization with the assert timing of the output enable OEN1 ((b) in FIG. 11). Accordingly, in response to the output enable OEN, the memory controller 50 reads the image data of the next line from the memory 120 and outputs the read image data together with the main scanning synchronization signal HSYNC0 ((c) in FIG. 11).

The operations of the second and third cycles T in FIG. 11 are similar to those of the first and second cycles T in FIG. 4. However, in the second cycle T, the modules MD2 and MD3 execute image processing of the dummy image data ((d) and (e) in FIG. 11). In the third cycle T, the modules MD2 and MD3 execute image processing of the previous line as compared to FIG. 4 ((f) and (g) in FIG. 11). In the embodiment illustrated in FIGS. 10 and 11, even when the image processing time by the image processing unit 40 crosses a plurality of cycles T, the output enable OEN can be asserted. Accordingly, it is possible to prevent the output enable synthesizing unit 90 from continuing to wait for the asserting of the output enable OEN2 and consequently falling into a deadlock state, and, therefore, the image processing apparatus 2 can be prevented from malfunctioning.

According to one embodiment of the present invention, the transfer performance of image data is prevented from being degraded, without generating abnormal image data, even when the image processing time varies according to whether functional expansion is implemented.

The image processing apparatus, the image processing apparatus controlling method, and the recording medium are not limited to the specific embodiments described in the detailed description, and variations and modifications may be made without departing from the spirit and scope of the present invention.

What is claimed is:

1. An image processing apparatus comprising:
a first hardware memory configured to store image data generated by an image reader and program instructions; and
a processor configured to access the first hardware memory, wherein execution of the program instructions stored in the first hardware memory cause the processor to:
construct a first image processor configured to execute a first image processing on the stored image data one line at a time,
construct a second image processor configured to execute a second image processing on the image data one line at a time, the second image processor being constructed when implementing functional expansion;
connect the constructed first image processor and the constructed second image processor by a transfer path of the image data when implementing the functional expansion,
generate a first allowance signal to allow reading of a next line of the image data from the first hardware memory, according to an image processing time taken by the first image processing;
generate a second allowance signal to allow reading of the next line of the image data from the first hardware memory, according to an image processing time taken by the second image processing; and
output, to the processor, a third allowance signal to allow reading of the next line of the image data from the first hardware memory, based on the first allowance signal and the second allowance signal.

2. The image processing apparatus according to claim 1, wherein the program instructions further cause the processor to:
output the third allowance signal based on an allowance signal for which a generation timing is later, among the first allowance signal and the second allowance signal, and
read the next line of the image data from the first hardware memory based on the third allowance signal and output the read image data together with a main scanning synchronization signal indicating an output timing of each line of the image data.

3. The image processing apparatus according to claim 2, wherein the program instructions further cause the processor to:
set the second allowance signal to a non-allowance state based on the main scanning synchronization signal, and
set the second allowance signal to an allowance state based on completion of reception of one line of the image data that has undergone the second image processing.

4. The image processing apparatus according to claim 2, wherein the program instructions further cause the processor to:
generate the main scanning synchronization signal in accordance with a minimum cycle regardless of the third allowance signal, upon determining that by generating the main scanning synchronization signal based on the third allowance signal, a generation cycle of the main scanning synchronization signal will become shorter than the minimum cycl e that is set in advance.

5. The image processing apparatus according to claim 1, further comprising:
a second hardware memory configured to hold the image data that has undergone the second image processing, wherein the program instructions further cause the processor to:
construct a plurality of sub-image processors of the first image processor, and connect the plurality of sub-image processors in series, and
connect the second image processor between two of the plurality of sub-image processors, wherein
one of the plurality of sub-image processors, which executes a third image processing on the image data output from the second image processor, executes the third image processing on the image data read from the second hardware memory in a cycle subsequent to a cycle in which one line of the image data that has undergone the second image processing is stored in the second hardware memory.

6. The image processing apparatus according to claim 5, wherein
the one of the plurality of sub-image processors, which executes the third image processing upon receiving the image data output from the second image processor, executes the third image processing on dummy image data in a cycle before a cycle in which the third image processing is executed on the image data that has undergone the second image processing.

7. The image processing apparatus according to claim 1, wherein
in a case where the second image processing is executed across a plurality of cycles, the second allowance signal is maintained in an allowance state except in a last cycle among the plurality of cycles.

8. The image processing apparatus according to claim 1, wherein
in a case where the functional expansion is not implemented, the first image processing is executed on one line of the image data in each cycle, and
in a case where the functional expansion is implemented, the first image processing and the second image processing are executed on one line of the image data in a plurality of cycles, and
the processor generates the first allowance signal and the second allowance signal in each cycle, and outputs the third allowance signal in each cycle.

9. A method for controlling an image processing apparatus, the image processing apparatus including a first hardware memory configured to store image data generated by an image reader and program instructions; and a processor configured to access the first hardware memory, wherein execution of the program instructions stored in the first hardware memory cause the processor to construct a first image processor configured to execute a first image processing on the image data one line at a time, and construct a second image processor configured to execute a second image processing on the image data one line at a time, the second image processor being constructed when implementing functional expansion, the method comprising:
connecting the constructed first image processor and the constructed second image processor by a transfer path of the image data when implementing the functional expansion;
generating a first allowance signal to allow reading of a next line of the image data from the first hardware memory, according to an image processing time taken by the first image processing;

generating a second allowance signal to allow reading of the next line of the image data from the first hardware memory, according to an image processing time taken by the second image processing; and outputting, to the processor, a third allowance signal to allow reading of the next line of the image data from the first hardware memory, based on the first allowance signal and the second allowance signal.

10. A non-transitory computer-readable recording medium storing a program that causes a computer to execute a process performed in an image processing apparatus, the image processing apparatus including a first hardware memory configured to store image data generated by an image reader and program instructions; and a processor configured to access the first hardware memory, wherein execution of the program instructions stored in the first hardware memory cause the processor to construct a first image processor configured to execute a first image processing on the image data one line at a time, and construct a second image processor configured to execute a second image processing on the image data one line at a time, the second image processor being constructed when implementing functional expansion, the process comprising:

connecting the constructed first image processor and the constructed second image processor by a transfer path of the image data when implementing the functional expansion;

setting a timing to allow reading of a next line of the image data from the first hardware memory, according to a first image processing time taken by the first image processing;

setting a timing to allow reading of the next line of the image data from the first hardware memory, according to a second image processing time taken by the second image processing; and allowing reading of the next line of the image data from the first hardware memory, based on the timing set according to the first image processing time and the timing set according to the second image processing time.

* * * * *